US011891843B2

(12) United States Patent
Le Borgne

(10) Patent No.: US 11,891,843 B2
(45) Date of Patent: Feb. 6, 2024

(54) LOCKING DEVICE COMPRISING A SHAPE MEMORY ELEMENT

(71) Applicant: FAURECIA INTERIEUR INDUSTRIE, Nanterre (FR)

(72) Inventor: Olivier Le Borgne, Saint Paul (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 49 days.

(21) Appl. No.: 17/476,133

(22) Filed: Sep. 15, 2021

(65) Prior Publication Data

US 2022/0081944 A1 Mar. 17, 2022

(30) Foreign Application Priority Data

Sep. 16, 2020 (FR) .................................... 20 09378

(51) Int. Cl.

*E05B 83/30* (2014.01)
*E05B 47/00* (2006.01)
*E05B 51/00* (2006.01)

(52) U.S. Cl.

CPC .......... *E05B 83/30* (2013.01); *E05B 47/0009* (2013.01); *E05B 51/005* (2013.01)

(58) Field of Classification Search

CPC ......... Y10T 292/0834; Y10T 292/0838; Y10T 292/0843; Y10T 292/0845; Y10T 292/0976; Y10T 292/1021; E05B 83/30; E05B 83/28; E05B 47/0009; E05B 47/0011; E05B 51/00; E05B 51/005; E05B 81/28; E05B 81/42; E05C 9/00; E05C 9/002; E05C 9/04; E05C 9/043; E05C 9/10; E05C 9/16; Y10S 292/66; B60R 7/04; B60R 7/06

(Continued)

(56) References Cited

U.S. PATENT DOCUMENTS 7,156,440 B2 * 1/2007 Katagiri .................. E05B 83/30 296/37.8
7,331,616 B2 * 2/2008 Brei .................... E05B 47/0009 292/201

(Continued)

FOREIGN PATENT DOCUMENTS

CN 109812170 A * 5/2019 ............... B60R 7/06
DE 102007061055 A1 6/2009

(Continued)

OTHER PUBLICATIONS

French Search Report corresponding to French Application No. FR 2009378, dated Jun. 4, 2021, 2 pages.

*Primary Examiner* — Kristina R Fulton
*Assistant Examiner* — Steven A Tullia
(74) *Attorney, Agent, or Firm* — Reising Ethington P.C.

(57) ABSTRACT

A locking device that includes: a locking element, movable between a locked position and an unlocked position and being forced to its locked position, a pin, and an actuator of the pin, the pin being configured to move the locking element from the locked position to the unlocked position when the actuator is actuated by changing the shape of a shape memory element. The pin is movable between: an extended position, in which it moves the locking element from its locked position to its unlocked position, and a retracted position, in which it releases the movement of the locking element to its locked position.

12 Claims, 5 Drawing Sheets

(58) Field of Classification Search
USPC .......................... 296/37.12, 37.1, 37.8, 24.34
See application file for complete search history.

(56) References Cited

U.S. PATENT DOCUMENTS

| | | | | |
|---|---|---|---|---|
| 7,380,855 | B2 * | 6/2008 | Ishiguro | E05B 83/30 296/37.1 |
| 7,766,409 | B2 * | 8/2010 | Ohnuki | E05B 63/242 292/231 |
| 7,984,942 | B2 * | 7/2011 | Schaupensteiner | E05B 83/30 296/37.8 |
| 8,157,300 | B2 * | 4/2012 | Niskanen | E05B 81/14 292/201 |
| 8,353,549 | B2 * | 1/2013 | Buchheit | E05B 83/30 70/77 |
| 8,740,262 | B2 * | 6/2014 | Buchheit | E05B 63/242 292/DIG. 37 |
| 9,316,031 | B2 * | 4/2016 | Abe | E05B 63/248 |
| 10,132,108 | B2 * | 11/2018 | Shimizu | E05B 63/20 |
| 2006/0028051 | A1 * | 2/2006 | Brei | E05F 15/60 296/193.11 |
| 2006/0055196 | A1 * | 3/2006 | Yamada | E05C 9/185 296/37.12 |
| 2006/0097535 | A1 * | 5/2006 | Nishimura | E05C 19/022 296/37.7 |
| 2008/0007081 | A1 | 1/2008 | Shibata et al. | |
| 2008/0022730 | A1 * | 1/2008 | Dietrich | E05B 83/30 70/158 |
| 2008/0100079 | A1 * | 5/2008 | Herrera | G07C 9/00912 296/37.1 |
| 2008/0216285 | A1 * | 9/2008 | Browne | B60N 3/023 16/110.1 |
| 2008/0217927 | A1 * | 9/2008 | Browne | F16D 63/006 292/28 |
| 2009/0152877 | A1 * | 6/2009 | Kim | E05B 83/30 292/174 |
| 2009/0152887 | A1 | 6/2009 | Schaupensteiner et al. | |
| 2009/0188288 | A1 * | 7/2009 | Soma | E05B 13/005 70/398 |
| 2010/0071424 | A1 * | 3/2010 | Tsuruta | E05B 83/30 70/91 |
| 2010/0215424 | A1 * | 8/2010 | Crookston | E05B 47/0009 310/306 |
| 2012/0261937 | A1 * | 10/2012 | Buchheit | E05B 83/30 220/262 |
| 2013/0043691 | A1 * | 2/2013 | Marz | F03G 7/06 292/144 |
| 2015/0123408 | A1 * | 5/2015 | Longo | E05B 83/30 292/137 |
| 2017/0328096 | A1 * | 11/2017 | Allen | E05C 9/006 |
| 2020/0002978 | A1 * | 1/2020 | Ketels | E05B 51/005 |
| 2020/0270920 | A1 * | 8/2020 | Hodgson | E05B 83/32 |
| 2021/0300253 | A1 * | 9/2021 | Rea | E05B 81/04 |

FOREIGN PATENT DOCUMENTS

| | | | | | |
|---|---|---|---|---|---|
| DE | 102010009380 | A1 | * | 9/2011 | B60N 3/08 |
| DE | 202013001917 | U1 | * | 5/2013 | E05B 81/40 |
| DE | 102012000913 | A1 | | 7/2013 | |
| DE | 112013001253 | T5 | * | 12/2014 | E05B 1/0038 |
| DE | 102014115880 | A1 | * | 5/2015 | E05B 1/0038 |
| DE | 102014222269 | A1 | * | 5/2016 | B60K 15/04 |
| DE | 102018205916 | A1 | * | 10/2019 | E05B 63/24 |
| EP | 2133565 | A2 | * | 12/2009 | F03G 7/065 |
| KR | 20080082756 | A | * | 7/2003 | E05B 47/0001 |
| KR | 20080103219 | A | * | 5/2007 | E05B 1/0038 |
| WO | WO-2020109622 | A2 | * | 6/2020 | E05B 47/0001 |
| WO | WO-2021260224 | A1 | * | 12/2021 | B60R 7/06 |

* cited by examiner

LOCKING DEVICE COMPRISING A SHAPE MEMORY ELEMENT

TECHNICAL FIELD

The present invention relates to a locking device for a movable part of a vehicle trim element, of the type comprising:

a locking element, movable along a direction of movement between a locked position and an unlocked position, the locking element being biased towards its locked position, a pin, and a actuator for actuating the pin, comprising a shape memory element, the pin being configured to move the locking element from the locked position to the unlocked position when the actuator is actuated by changing the shape of the shape memory element.

The invention also relates to a trim element comprising such a locking device.

BACKGROUND

For example, the invention relates to a locking device for locking a door or lid of a storage compartment, a drawer or a tray in a closed position on a vehicle dashboard or center console.

For example, in order to unlock such a movable part and allow it to move to an open position, it is known to actuate the locking element to move it to an unlocked position for example by deforming a shape memory element connected to the locking element.

For example, it is known to have an electric current pass through the shape memory element to deform it, for example by contraction, in order to move the locking element to its unlocked position. The deformation of the shape memory element is due to the increase in its temperature resulting from the passage of the electric current.

However, in order for the locking element to return to its locked position, the shape memory element must cool down to its original shape, which takes some time. Therefore, there is a certain amount of time during which the movable part cannot be held in the closed position by the locking device.

SUMMARY

One of the purposes of the invention is to provide a simple locking device that allows the movable part to be locked or unlocked at any time and regardless of the shape of the shape memory element.

To this end, the invention relates to a locking device of the aforementioned type, in which the pin is movable relative to the locking element along a push direction between:

an extended position, in which the pin bears on the locking element and moves said locking element from its locked position to its unlocked position when the actuator is actuated, and a retracted position, in which the pin authorizes the movement of the locking element towards its locked position, the pin being moved to its retracted position when the locking element is in its unlocked position.

The shape memory element is thus initially coupled to the locking element via the pin, to move the locking element from its locked position to its unlocked position, and decouples from the locking element by moving the pin to its retracted position when the locking element is in its unlocked position, to allow it to return quickly to its locked position under the effect of the stress on it. Thus, when it is desired to open a compartment as described above and quickly close it afterwards, it is not necessary to wait for the shape memory element to return to its original shape before placing the locking element in its locked position.

According to various embodiments, one or more of the following optional features of the invention may be included, either alone or in any technically conceivable combination:

the actuator is movable along the direction of movement between an actuating position, in which the pin is in its extended position and moves the locking element between its locked position and its unlocked position, and an intermediate position, in which the pin is in its extended position and the locking element is in its unlocked position, the actuator further being movable along the direction of movement between its intermediate position and a release position, the pin moving from its extended position to its retracted position when the actuator moves from the intermediate position to the release position while the locking element is in its unlocked position;

the locking device comprises a stop, the locking element comprising a complementary stop, the complementary stop interacting with the stop so as to block the movement of the locking element along the direction of movement when the locking element is in its unlocked position;

the device comprises a first biasing element, the first biasing element applying a first biasing force to the locking element along a first sense of movement so as to bias the locking element towards its locked position;

the actuator comprises a second biasing element, the second biasing element applying a second biasing force to the pin along a first sense of push so as to bias the pin towards its extended position;

the locking element comprises an interaction surface, the pin comprising a complementary interaction surface, the complementary interaction surface bearing on the interaction surface in the extended position of the pin and being spaced from the interaction surface in the retracted position of the pin, the complementary interaction surface applying a displacement force to the interaction surface when the pin is in the extended position and when the actuator is actuated, the displacement force being applied in a second sense of movement, opposite to the first sense of movement in the same direction of movement and being greater than the first biasing force the interaction surface applies a retracting force to the complementary interaction surface when the actuator moves from its intermediate position to its release position, the retracting force being applied in a second sense of push that is opposite the first sense of push, in the same push direction, and being greater than the second biasing force, so that it moves the pin (16) from its extended position to its retracted position;

at least one of the interaction surface and the complementary interaction surface forms a non-zero angle with the direction of movement, the angle advantageously being between 40° and 50°; and the complementary interaction surface slides over the interaction surface when the actuator is moved between its intermediate position and its release position so that the pin moves between its extended position and its retracted position.

According to another aspect, the invention also relates to a vehicle trim element of the type comprising:

a body, a movable part, movable between a closed position and an open position relative to the body, and a locking device as previously described, the movable part being locked in the closed position when the locking element is in its locked position and being movable from the closed position to the open position when the locking element is in its unlocked position.

BRIEF DESCRIPTION OF THE DRAWINGS

Further aspects and advantages of the invention will become apparent from the following description, given by way of example and made with reference to the accompanying drawings, in which.

DETAILED DESCRIPTION

A trim element 1 for a vehicle, comprising a body 2 and a movable part 4 is described with reference to FIG. 1.

For example, the trim element 1 is a dashboard, a center console, a door panel or another trim element for the passenger compartment of a vehicle. For example, the body 2 is formed by a part to be fixed to a main part of this trim element as shown in FIG. 1 or directly by the main part of the trim element 1.

For example, the movable part 4 is formed by a storage compartment, a drawer, a door allowing access to a storage volume in the body 2 or a tray retractable in the body 2. The movable part 4 is movable relative to the body 2 between a closed position (not shown) in which the storage volume defined or formed by the movable part 4 is inaccessible, and an open, or extended, position (visible in FIG. 1) in which the storage volume is accessible from the exterior of the trim element 1. For example, the movement of the movable part 4 between the closed position and the open position is a translational or rotational movement relative to the body 2. For example, the movable part 4 is movable between the open and closed position by translation along an opening direction θ.

The trim element 1 will now be described with reference to the trim element shown in FIG. 1, in which the movable part 4 is a drawer, movable in translation relative to the body 2. It is understood, however, that the invention applies to other types of trim elements as long as they comprises a body 2 and a movable part 4 movable relative to the body 2.

Figure 1:
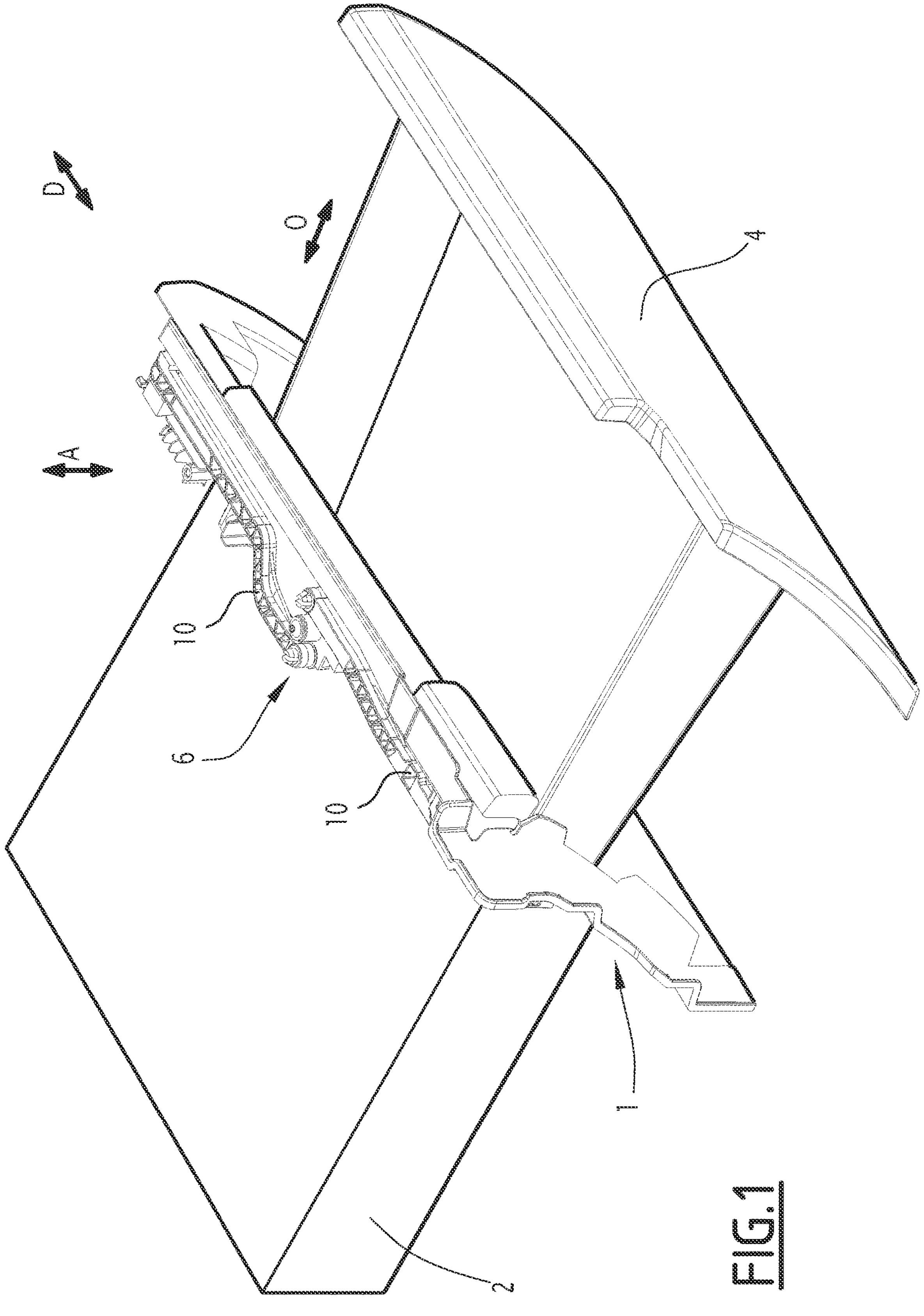
FIG. 1 is a schematic perspective representation of a trim element for a vehicle comprising a locking device according to an embodiment of the invention, the movable part of the trim element being in an open position.

According to the example illustrated in FIG. 1, the trim element 1 comprises a locking device 6 connected to the body 2 of the trim element 1 and configured to hold the movable part 4 in the closed position or to allow its movement towards the open position. The movable part 4 of the trim element 1 comprises a locking support (not visible) arranged to interact with the locking device 6 to hold the movable part 4 in the closed position. When the locking device 6 interacts with the locking support, the movable part 4 is locked in the closed position.

According to the example illustrated in FIG. 1, the locking device 6 comprises a locking element 10 connected to the body 2 and adapted to interact with the movable part 4 to hold the movable part 4 in the closed position. In particular, the locking element 10 is adapted to interact with the locking support of the movable part 4.

According to a variant not shown, the locking device 6 is connected to the movable part 4. The body 2 then comprises the locking support. The locking element 10 is then connected to the movable part 4 and is able to interact with the body 2 to hold the movable part 4 in the closed position, in particular with the locking support of the body 2.

In the following, the locking device 6 is described according to the example shown in FIG. 1. It is understood that the operation is similar for the variant in which the locking device 6 is connected to the movable part 4.

The locking element 10 is made in one piece, for example. It is movable in a direction of movement D between a locked position (visible in FIG. 2) and an unlocked position (visible in FIGS. 3 to 5).

The direction of movement D is characterized by a first sense of movement D1 in which the locking element 10 moves towards the locked position and a second sense of movement D2, opposite to the first sense of movement D1, in which the locking element 10 moves towards the unlocked position.

The locking element 10 extends at least partially along the direction of movement D between a first end 22 and a second end 23.

In the locked position, the locking element 10 interacts with the movable part 4 to hold the movable part 4 in the closed position. In particular, the locking element 10 then interacts with the locking support of the movable part 4. In other words, in the locked position, the locking element 10 ensures an attachment of the body 2 with the movable part 4 when the movable part is in its closed position. For example, the locking element 10 ensures the attachment of the body 2 with the movable part 4 via a finger (non-illustrated) connected to the locking element 10 and a complementary orifice (non-illustrated) defined by the body 2. In the locked position and when the movable part 4 is in its closed position, the movable part 4 cannot move to the open position.

In the unlocked position, the locking element 10 is away from the movable part 4 and cannot interact with the locking support so that the movable part 4 is free to move between the closed position and the open position. In the unlocked position and when the movable part 4 is in its closed position, the movable part 4 can move towards its open position, for example, when the movable part 4 is pulled by a user, moved by a motorized system or due to gravity.

The movable part 4 is locked in the closed position when the locking element 10 is in its locked position and is movable from the closed position to the open position when the locking element 10 is in its unlocked position.

The locking device 6 further comprises a stop 12, configured to interact with the locking element 10. The stop 12 is held by a body element 13 of the body 2, for example.

With reference to FIGS. 2-5, the stop 12 is an insert attached to the body element 13 of the body 2, for example. In particular, the stop 12 is attached to a surface of the body element 13 facing the locking element 10. According to a variant, the stop 12 is integral with the body element 13.

The locking element 10 comprises a complementary stop 24, adapted to interact with the stop 12.

The complementary stop 24 interacts with the stop 12 so as to block movement of the locking element 10 in the second sense of movement D2 when the locking element 10 is in its unlocked position. Thus, in the unlocked position, the stop 12 and the complementary stop 24 are in contact with each other along the second sense of movement D2, which prevents a movement of the locking element 10 beyond the unlocked position along this direction.

For example, the unlocked position corresponds to the position of the locking element 10 in which the stop 12 and the complementary stop 24 interact. In a variant, the unlocked position corresponds to an intermediate position in which the complementary stop 24 is moved closer to the stop 12 without the stop 12 and the complementary stop 24 being in contact.

The locking device 6 further comprises a first biasing element 14, applying a first biasing force $Fc_1$ to the locking element 10.

With reference to FIGS. 2-5, the first biasing element 14 is, for example, a spring extending substantially along the direction of movement D and exerting a push on the locking element 10. For example, the first biasing element 14 is connected to the body element 13 of the body 2 on the one hand and with the first end 22 of the locking element 10 on the other hand. The first biasing element 14 applies the first biasing force $Fc_1$ to the first end 22 of the locking element 10 in the first sense of movement D1. The first biasing element 14 biases the locking element 10 towards its locked position.

The locking device further comprises a pin 16, able to interact with the locking element 10 and an actuator 18 for actuating the pin 16.

Figure 5:
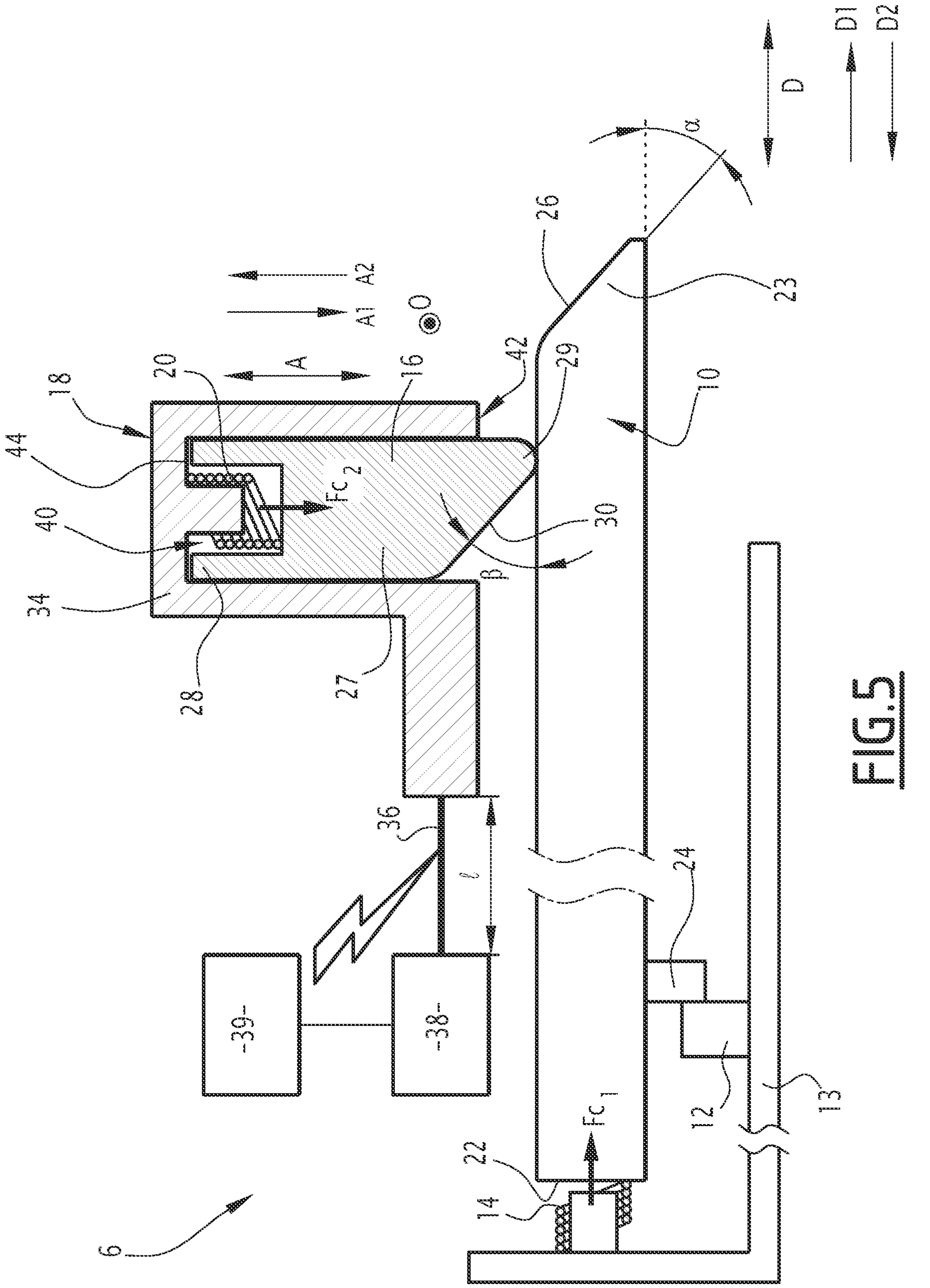
FIG. 5 is a schematic cross-sectional representation of the locking device of FIG. 2, with the locking element in its unlocked position, the pin in its retracted position, and the actuator being in a release position.

The pin 16 is movable relative to the locking element 10 along a push direction A between an extended position (visible in FIGS. 2 and 3) and a retracted position (visible in FIG. 5).

The push direction A is characterized by a first sense of push A1, in which the pin 16 moves towards the extended position and a second sense of push A2, opposite to the first sense of push A1, in which the pin 16 moves towards the retracted position.

For example, the push direction A is different from the direction of movement D. In other words, the push direction A and the direction of movement D are not parallel. For example, the push direction A is orthogonal to the direction of movement D. As will be described below, the pin 16 is further movable along the direction of movement D, the pin being moved in the second sense of movement D2 when the actuator 18 is actuated.

The pin 16 comprises a support portion 27 extending along the push direction A between a first end 28 and a second end 29.

In the extended position, the pin 16 bears on the locking element 10. The pin 16 exerts a force on the locking element 10, opposing the first biasing force $Fc_1$. When the actuator 18 is actuated, the pin 16 is moved in the second sense of movement D2 and exerts a force on the locking element 10 such that the pin 16 moves the locking element 10 from its locked position to its unlocked position.

In particular, the pin 16 is in direct contact with the locking element 10. In other words, no intermediate part is interposed between the pin 16 and the locking element 10.

In the retracted position, the pin 16 authorizes the movement of the locking element 10 towards its locked position and is mechanically decoupled from the locking element 10.

The pin 16 is moved towards its retracted position when the locking element 10 is in its unlocked position.

The pin 16 bears on the locking contact 10 throughout the movement of the locking element 10. In other words, the pin 16 bears on the locking element 10 when the pin 16 is in the extended position and also when the pin 16 is in the retracted position, as well as between these positions.

In particular, the locking element 10 comprises an interaction surface 26. For example, the interaction surface 26 is located on the second end 23 of the locking element 10. The pin 16 comprises a complementary interaction surface 30, able to cooperate with the interaction surface 26 of the locking element 10. For example, the complementary interaction surface 30 is located on the second end 29 of the support portion 27.

In the extended position of the pin 16, the complementary interaction surface 30 bears on the interaction surface 26 of the locking element 10.

In the retracted position of the pin 16, the complementary interaction surface 30 is spaced from the interaction surface 26 of the locking element 10.

Figure 3:
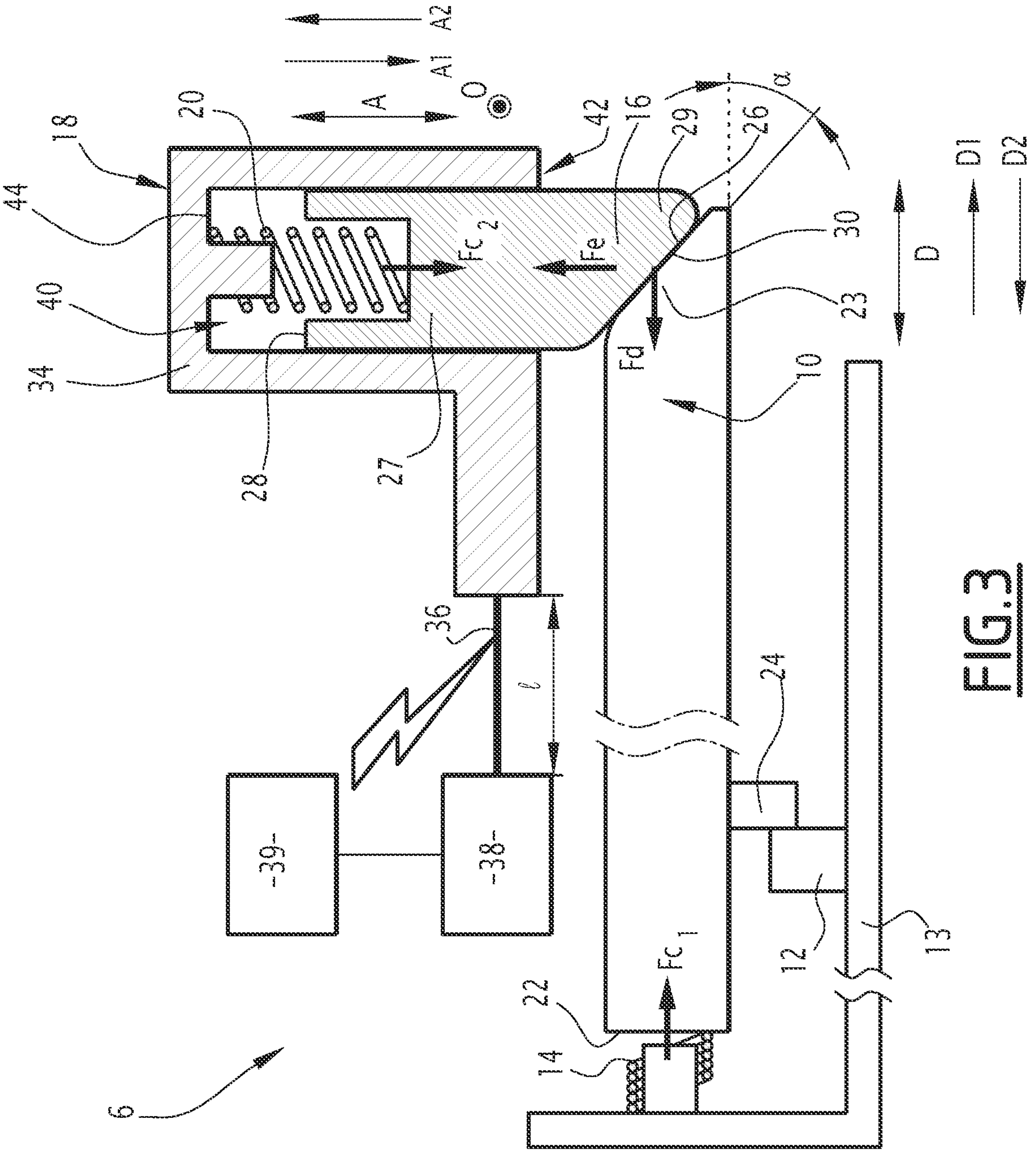
FIG. 3 is a schematic cross-sectional representation of the locking device of FIG. 2, with the locking element in its unlocked position, the pin in an extended position, and the actuator being in an intermediate position.

As illustrated in FIG. 3, the complementary interaction surface 30 applies a displacement force Fd to the interaction surface 26 when the pin 16 is in the extended position and when the actuator 18 is actuated. The displacement force Fd is applied in the second sense of movement D2 and is greater than the first biasing force $Fc_1$.

As will be described below, when the actuator 18 is actuated, the interaction surface 26 applies a retracting force Fe to the complementary interaction surface 30. As illustrated in FIG. 3, the retracting force Fe is applied along the second sense of push A2. As will be described below, this retracting force Fe is greater than a second biasing force $Fc_2$ applied by a second biasing element 20 to the pin 16, such that the retracting force Fe moves the pin 16 from its extended position to its retracted position.

At least one of the interaction surface 26 and the complementary interaction surface 30 forms a non-zero angle $\alpha$, $\beta$ with the direction of movement D. The angle $\alpha$ is advantageously between 40° and 50°. According to the example shown in FIGS. 2 to 5, the interaction surface 26 forms the angle $\alpha$ with the direction of movement D and the complementary interaction surface 30 forms an angle $\beta$, complementary to the angle $\alpha$, with the direction of movement D. According to a variant, only one of the interaction surface 26 and the complementary interaction surface 30, forms a non-zero angle $\alpha$ with the direction of movement D.

The actuator 18 is movable along the direction of movement D between an actuating position (visible in FIG. 2), an intermediate position (visible in FIG. 3) and a release position (visible in FIG. 5). In particular, the actuator 18 is movable between the actuating, intermediate and release positions by translation along the direction of movement D.

The actuator 18 comprises an actuating support 34, the second biasing element 20, a deformable shape memory element 36, an electrical power source 38 and a control element 39.

Figure 2:
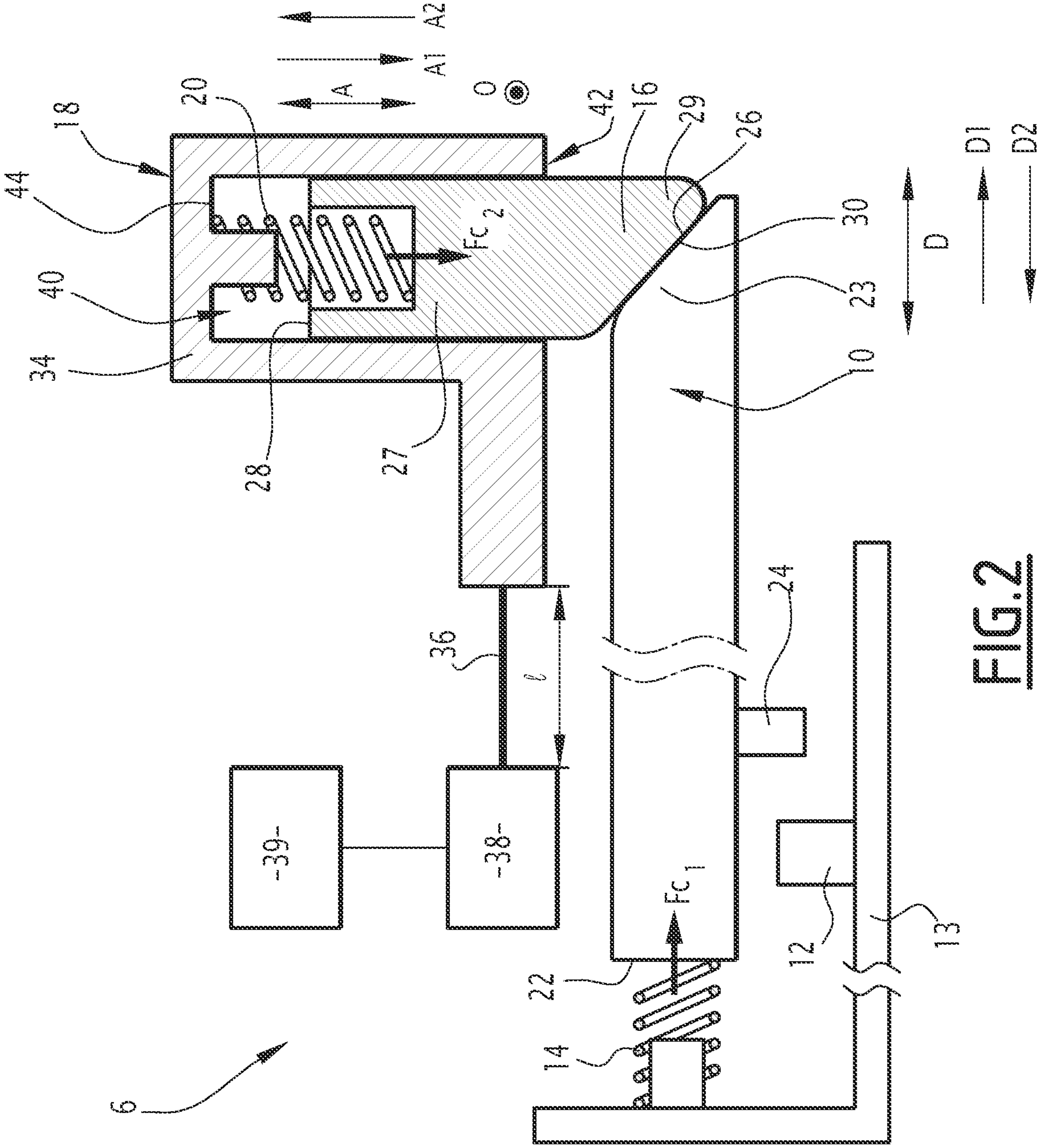
FIG. 2 is a schematic cross-sectional representation of a locking device according to an embodiment of the invention, the locking element being in its locked position, the pin being in an extended position, the actuator being in an actuating position.

In the actuating position, the pin 16 is in its extended position and the locking element 10 is either in the locked position (as shown in FIG. 2) or in a position between the locked position and the unlocked position (not shown).

In the intermediate position, the pin 16 is in its extended position and the locking element 10 is in its unlocked position, as seen in FIG. 3.

In the release position, the pin 16 is in its retracted position and the locking element 10 is free to move to its locked position, as visible in FIG. 5.

The pin 16 moves from its extended position to its retracted position when the actuator 18 moves from the intermediate position to the release position while the locking element 10 is in its unlocked position. In particular, the pin 16 moves from its extended position to its retracted position by sliding of the complementary interaction surface 30 over the interaction surface 26.

The actuator 18 is configured to move from the intermediate position to the release position when the complementary stop 24 interacts with the stop 12.

The pin 16 is configured to move the locking element 10 from the locked position to the release position when the actuator 18 is actuated.

When the actuator 18 moves from its intermediate position to its release position, the interaction surface 26 applies the retracting force Fe to the complementary interaction surface 30 so as to cause the pin 16 to move to its retracted position.

Due to the non-zero angle $\alpha$, $\beta$ with the direction of movement D, formed by at least one of the interaction surface 26 and the complementary interaction surface 30, the complementary interaction surface 30 slides on the interaction surface 26 when the actuator 18 is moved between its intermediate position and its release position so that the pin 16 moves between its extended position and its retracted position.

The actuating support 34 provides a support for the second biasing element 20 and for the pin 16.

The actuating support 34 defines a housing 40 extending along the push direction A between a free edge 42 and a bottom wall 44.

The pin 16 is movable within the housing 40 between the extended position and the retracted position.

The second biasing element 20 applies the second biasing force $Fc_2$ to the pin 16.

With reference to FIGS. 2-5, the second biasing element 20 is, for example, a spring extending substantially along the push direction A and exerting a push on the pin 16. For example, the second biasing element 20 is connected to the bottom wall 44 of the actuating support 34 on the one hand and to the first end 28 of the support portion 27 of the pin 16 on the other hand. For example, the second biasing element 20 extends into the housing 40 between the bottom wall 44 and the first end 28 of the pin 16. The second biasing element 20 applies the second biasing force $Fc_2$ in the first sense of push A1 to the first end 28 of the pin 16. The second biasing element 20 stresses the pin 16 towards its extended position.

The actuator 18 is actuatable by changing the shape of the shape memory element 36. In particular, the actuator 18 is configured to be moved between the actuating, intermediate, and release positions by changing the shape of the shape memory element 36.

The shape memory element 36 is connected to the actuating support 34.

For example, the shape memory element 36 extends in an extension direction parallel to the direction of movement D of the locking element 10.

The shape memory element 36 is deformable between an initial shape and a deformed shape. The deformed shape corresponds to the shape memory element 36 contracting along the direction of movement D, for example. In particular, the shape of the shape memory element 36 depends on its temperature.

In particular, the shape memory element 36 is composed of a shape memory alloy. As the temperature of the shape memory alloy increases, the alloy contracts, which leads to a deformation of the shape memory element 36. As the temperature of the shape memory alloy decreases, the alloy relaxes and returns to its initial shape.

The shape memory element 36 is configured such that as its temperature increases, a dimension I of the shape memory element 36 along the direction of movement D decreases and as its temperature decreases, the dimension I of the shape memory element 36 increases.

The electrical power source 38 is connected to the shape memory element 36. The electrical power source 38 is configurable between an active configuration, in which it provides an electrical current flowing through the shape memory element 36 and an inactive configuration, in which it does not provide an electrical current. As electrical current flows through the shape memory element 36, the temperature of the shape memory element 36 increases. Thus, when the electrical energy source 38 is in the active configuration, the shape memory element 36 deforms and, in particular, contracts. When the electrical energy source 38 is in the active configuration, the dimension I of the shape memory element 36 decreases.

When the electrical energy source 38 is in an inactive configuration, the shape memory element 36 deforms and, in particular, relaxes. The dimension I of the shape memory element 36 then increases.

The deformation of the shape memory element 36 is reversible. In other words, after being heated from an initial temperature to a heating temperature and then cooled from the heating temperature to the initial temperature, the shape memory element 36 returns to its initial shape. The time required for the shape memory element 36 to return to its initial shape is between 1 second and 3 seconds, for example.

The control element 39 is connected to the electrical power source 38. The control element 39 is configured to control the electrical power source 38 between the active configuration and the inactive configuration.

The control element 39 is intended to be operated by a user, for example. The control element 39 is a button or a handle, for example.

In the following, a method for operating the locking device 6 as described above is described.

It is assumed that the movable part 4 is initially in the closed position and that the locking device 6 holds the movable part 4 in the closed position. As shown in FIG. 2, the locking element 10 is therefore in the locked position.

To move the movable part 4 to the open position, a user operates the control element 39 to put the electrical power source 38 in an active configuration. The shape memory element 36 contracts, which actuates the actuator 18. The pin 16 then moves the locking element 10 from its locked position to its unlocked position. The movement of the locking element in the second direction of movement D2 is blocked when the stop 12 and the complementary stop 24 interact.

The movable part 4 can then move into its open position.

Figure 4:
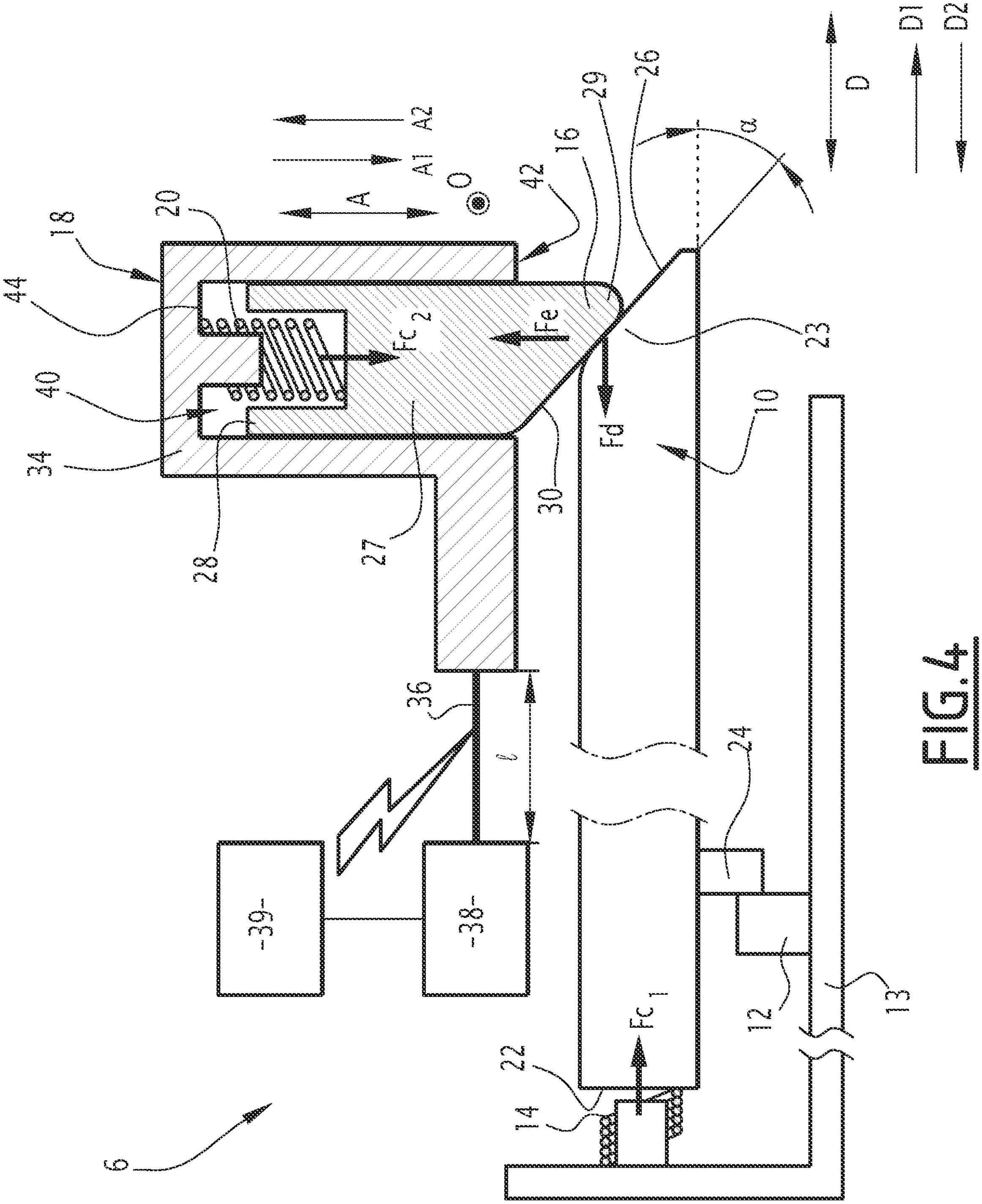
FIG. 4 is a schematic cross-sectional representation of the locking device of FIG. 2, with the locking element in its unlocked position, the pin between its extended position and its retracted position, the actuator being between its intermediate position and its release position.

As illustrated in FIG. 4, the pin 16 continues to move along the direction of movement D in the second sense of movement D2 which causes the pin to move from its extended position to its retracted position. As shown in FIG. 5, when the pin 16 is in the retracted position, the actuator 18 is in the release position.

In the release position, the locking element 10 and the pin 16 are mechanically decoupled. The first biasing force $Fc_1$ applied by the first biasing element 14 to the locking element 10 causes the locking element 10 to move to its locked position.

The movable part 4 can then be moved back into its closed position and held there by the locking device 6 without waiting for the shape memory element 36 to cool down.

As the shape memory element 36 cools down, it returns to its initial shape. The actuator 18 moves in the first sense of movement D1 to its actuating position. When the shape memory element 36 has returned to its initial shape, the actuator 18 can be actuated to move the movable part 4 back into the open position.

The locking device 6 allows the movable part 4 to be moved between its closed position and its open position freely while retaining the possibility of locking the movable part in its closed position at any time without being constrained by a cooling time of the shape memory element 36.

The locking device 6 provides a simple means of coupling the locking element 10 with the shape memory element 36 when the locking element is to be moved to the unlocked position and decoupling the locking element 10 with the shape memory element 36 when the movable part 4 is to be locked in the closed position.

The invention claimed is:

1. A locking device for a movable part of a trim element of a vehicle, comprising:

a locking element, movable along a direction of movement between a locked position and an unlocked position, the locking element being biased towards the locked position, a pin, and an actuator for actuating the pin comprising a shape memory element, the pin being configured to move the locking element from the locked position to the unlocked position when the actuator is actuated by changing the shape of the shape memory element, wherein the pin is movable relative to the locking element along a push direction between:

an extended position, in which the pin bears on the locking element and moves said locking element from the locked position to the unlocked position when the actuator is actuated, and a retracted position, in which the pin authorizes the movement of the locking element towards the locked position, the pin being moved to the retracted position when the locking element is in the unlocked position, wherein the actuator is movable along the direction of movement between an actuating position in which the pin is in the extended position and moves the locking element between the locked position and the unlocked position, and an intermediate position in which the pin is in the extended position and the locking element is in the unlocked position, the actuator further being movable along the direction of movement between the intermediate position and a release position, the pin moving from the extended position to the retracted position when the actuator moves from the intermediate position to the release position while the locking element is in the unlocked position.

2. The locking device according to claim 1, comprising a stop, the locking element comprising a complementary stop, the complementary stop interacting with the stop so as to block the movement of the locking element along the direction of movement when the locking element is in the unlocked position.

3. The locking device according to claim 1, comprising a first biasing element, the first biasing element applying a first biasing force to the locking element in a first sense of movement so as to bias the locking element towards the locked position.

4. The locking device according to claim 3, wherein the actuator comprises a second biasing element, the second biasing element applying a second biasing force to the pin along a first sense of push so as to bias the pin towards the extended position.

5. The locking device according to claim 4, wherein the locking element comprises an interaction surface, the pin comprising a complementary interaction surface, the complementary interaction surface bearing on the interaction surface in the extended position of the pin and being spaced from the interaction surface in the retracted position of the pin, the complementary interaction surface applying a displacement force to the interaction surface when the pin is in the extended position and when the actuator is actuated, the displacement force being applied in a second sense of movement, opposite to the first sense of movement, in the same direction of movement, and being greater than the first biasing force.

6. The locking device according to claim 5, wherein the interaction surface applies a retracting force to the complementary interaction surface when the actuator moves from the intermediate position to the release position, the retracting force being applied in a second sense of push that is opposite the first sense of push, in the same push direction, and being greater than the second biasing force, so that the retracting force moves the pin from the extended position to the retracted position.

7. The locking device according to claim 5, wherein at least one of the interaction surface and the complementary interaction surface forms a non-zero angle with the direction of movement.

8. The locking device according to claim 7, wherein the actuator is movable along the direction of movement between the actuating position in which the pin is in the extended position and moves the locking element between the locked position and the unlocked position, and the intermediate position in which the pin is in the extended position and the locking element is in the unlocked position, the actuator further being movable along the direction of movement between the intermediate position and the release position, the pin moving from the extended position to the retracted position when the actuator moves from the intermediate position to the release position while the locking element is in the unlocked position, and wherein the complementary interaction surface slides over the interaction surface when the actuator is moved between the intermediate position and the release position so that the pin moves between the extended position and the retracted position.

9. A trim element of a vehicle comprising:

a body, a movable part, movable between a closed position and an open position relative to the body, and a locking device according to claim 1, the movable part being blocked in the closed position when the locking element is in the locked position and being movable from the closed position to the open position when the locking element is in the unlocked position.

10. The locking device according to claim 7, wherein the angle is between 40° and 50°.

11. A locking device for a movable part of a trim element of a vehicle, comprising:

a locking element, movable along a direction of movement between a locked position and an unlocked position, the locking element being biased towards the locked position, a pin, and an actuator for actuating the pin comprising a shape memory element, the pin being configured to move the locking element from the locked position to the unlocked position when the actuator is actuated by changing the shape of the shape memory element, wherein the pin is movable relative to the locking element along a push direction between:

an extended position, in which the pin bears on the locking element and moves said locking element from the locked position to the unlocked position when the actuator is actuated, and a retracted position, in which the pin authorizes the movement of the locking element towards the locked position, the pin being moved to the retracted position when the locking element is in the unlocked position;

wherein the actuator comprises an actuating support providing a support for the pin and having a housing extending along the push direction;

wherein the pin is movable within the housing between the extended position and the retracted position;

wherein the shape memory element is connected to the actuating support and extends in an extension direction parallel to the direction of movement of the locking element;

wherein the pin is configured to move linearly along the push direction between the extended position and the retracted position, and wherein the push direction is not parallel to the direction of movement between the locked position and the unlocked position; and wherein the shape memory element is configured to move the support along the direction of movement by modification of the shape of the shape memory element to:

displace the locking element from the locked position to the unlocked position while the pin is in the extended position;

once the locking element is in the unlocked position, move the pin from the extended position to the retracted position, the displacement of the pin in the retracted position making the displacement of the locking element free from the unlocked position to the locked position.

12. A locking device for a movable part of a trim element of a vehicle, comprising:

a locking element, movable along a direction of movement between a locked position and an unlocked position, the locking element being biased towards the locked position, a pin, and an actuator for actuating the pin comprising a shape memory element, the pin being configured to move the locking element from the locked position to the unlocked position when the actuator is actuated by changing the shape of the shape memory element, wherein the pin is movable relative to the locking element along a push direction between:

an extended position, in which the pin bears on the locking element and moves said locking element from the locked position to the unlocked position when the actuator is actuated, and a retracted position, in which the pin authorizes the movement of the locking element towards the locked position, the pin being moved to the retracted position when the locking element is in the unlocked position;

wherein the pin is configured to move linearly along the push direction between the extended position and the retracted position, and wherein the push direction is not parallel to the direction of movement between the locked position and the unlocked position; and wherein, in the retracted position, the pin is mechanically uncoupled from the locking element while being still in contact with the locking element, resting on a lateral side of the locking element.

* * * * *